United States Patent [19]
Wridt

[11] Patent Number: 5,979,532
[45] Date of Patent: Nov. 9, 1999

[54] VERSATILE TIRE LEVER

[75] Inventor: Gerald A. Wridt, Racine, Wis.

[73] Assignee: Snap-on Tools Company, Kenosha, Wis.

[21] Appl. No.: 09/078,910

[22] Filed: May 14, 1998

[51] Int. Cl.$^6$ .................................................. B60C 25/04
[52] U.S. Cl. .............................................. 157/1.3; 157/1.1
[58] Field of Search ................................. 157/1.1, 1.17, 157/1.3, 1.22; 7/166; 81/DIG. 7

[56]  References Cited

U.S. PATENT DOCUMENTS

| 642,643 | 2/1900 | Swanton .................................. 157/1.1 |
| 929,905 | 8/1909 | Webber . |
| 951,200 | 3/1910 | Pilliner . |
| 1,098,488 | 6/1914 | Dyar ....................................... 157/1.22 |
| 1,385,948 | 7/1921 | Norlund . |
| 2,121,129 | 6/1938 | Malone . |
| 2,188,211 | 1/1940 | Tilson . |
| 2,226,757 | 12/1940 | Ewell . |
| 2,311,789 | 2/1943 | Taylor . |
| 2,344,704 | 3/1944 | Krantz . |
| 2,503,683 | 4/1950 | Perkins . |
| 2,508,069 | 5/1950 | Lowry . |
| 2,634,803 | 4/1953 | Obee . |
| 3,771,581 | 11/1973 | Johnson . |
| 4,360,052 | 11/1982 | Norris . |
| 4,461,335 | 7/1984 | Beemer . |
| 5,213,146 | 5/1993 | Onozawa ................................ 157/1.3 |

FOREIGN PATENT DOCUMENTS

| 100576 | 4/1937 | Australia ................................. 157/1.3 |
| 407172 | 9/1944 | Italy ....................................... 157/1.3 |

OTHER PUBLICATIONS

Quentin 1997 Master Buying Guide, published prior to May 14, 1997, cover pages and p. 400.

*Primary Examiner*—David A. Scherbel
*Assistant Examiner*—Joni B. Danganan
*Attorney, Agent, or Firm*—Emrich & Dithmar

[57]  ABSTRACT

A tire lever is adopted for use in removing a tire having a bead from a bicycle wheel rim having a plurality of spokes disposed thereon. The lever includes an elongated body having an axis, and including a tire engagement end for engaging the bead of the tire, a top surface, a bottom surface, a side surface connecting the top and bottom surfaces, and walls projecting from opposite side surfaces defining engagement surfaces for engaging one of the spokes. The engagement surfaces have axial lengths greater than the distance between the top and bottom surfaces and forms an acute angle with the axis.

18 Claims, 3 Drawing Sheets

VERSATILE TIRE LEVER

BACKGROUND OF THE INVENTION

1. Field of the Invention

This invention relates to bicycle tools, and more particularly to tire levers.

2. Description of the Prior Art

Tire levers have been used in the past to remove tires from bicycle wheel rims. These levers include a tire-engaging end to pull a portion of the tire over the rim and a spoke-engaging end to couple to a spoke to maintain the tire-engaging end in a position which keeps the tire portion over and spaced from the outer side of the rim so that a tire-engaging end of another lever can be inserted in this created space between the rim and tire. The second lever then can be worked around the perimeter of the rim to fully remove the tire.

In the past, the spoke-engaging end typically consisted of a single hook or slot formed on one side of the lever. This single slot limited the versatility and ease of use of the lever. The single hook generally made it more difficult to use with one hand versus the other. Additionally, it was often difficult to engage the hook on a spoke.

SUMMARY OF THE INVENTION

It is a general object of the invention to provide an improved tire lever which avoids the disadvantages of prior levers while affording additional structural and operating advantages.

An important feature of the invention is the provision of a tire lever which is of relatively simple and economical construction.

A further feature of the invention is the provision of a lever of the type set forth which can easily be used by right- or left-handed users.

A still further feature of the invention is the provision of a lever of the type set forth which includes a spoke-engaging surface having a large contact area to better engage the spoke and maintain the lever in place.

One or more of these features may be attained by providing a tire lever for use in removing a tire having a bead from a bicycle wheel rim having a plurality of spokes disposed thereon. The lever includes an elongated body having a longitudinal axis. The body includes a tire engagement end for engaging the bead of the tire, a top surface, a bottom surface, a side surface connecting the top and bottom surfaces, and a first wall projecting from a side surface defining a first engagement surface for engaging one of the spokes. The first engagement surface has an axial length greater than the distance between the top and bottom surfaces, the first engagement surface forming an acute angle with the axis.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENT

Figure 1:
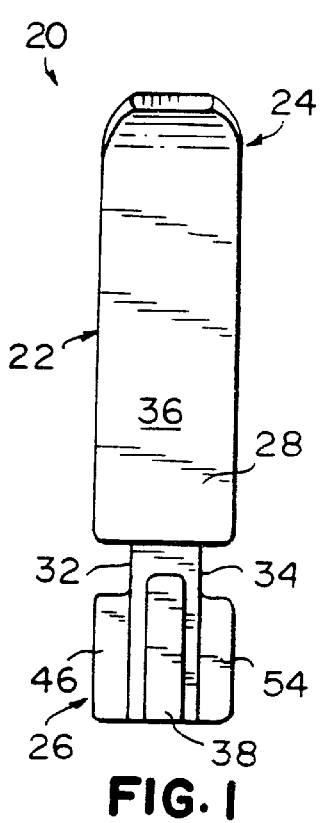
FIG. 1 is a bottom plan view of the tire lever of the present invention.

Referring to the drawings, a one-piece tire lever 20 is illustrated. The tire lever 20 may be made of a light-weight, yet strong material, such as glass-filled nylon. The tire lever 20 has an elongated body 22 having a longitudinal axis "A" (FIG. 3), a hook-shaped tire-engaging end 24 and a spoke-engaging end 26. The body 22 also includes a bottom surface 28 and a top surface 30 connected by a first and second side surfaces 32, 34.

Figure 5:
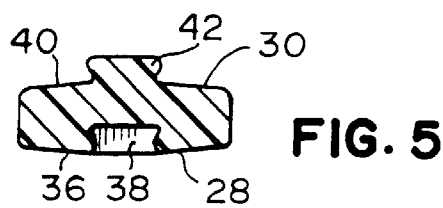
FIG. 5 is an enlarged sectional view taken generally along line 5—5 of FIG. 3.
Figure 10:
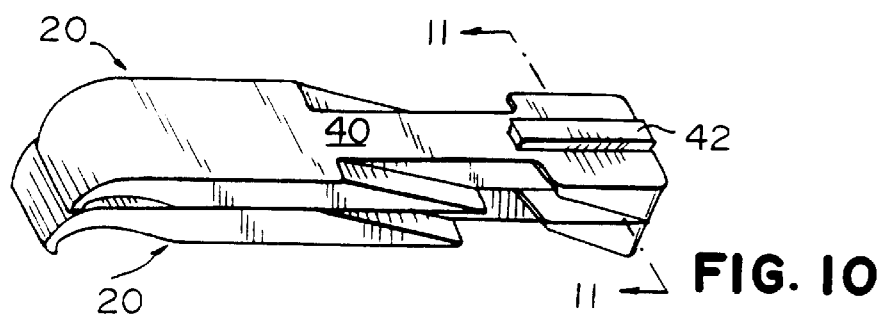
FIG. 10 is a perspective view of two tire levers coupled together.
Figure 11:
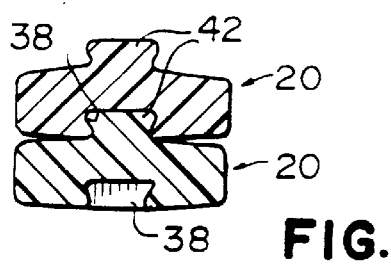
FIG. 11 is an enlarged sectional view taken generally along line 11—11 of FIG. 10.
Figure 6A:
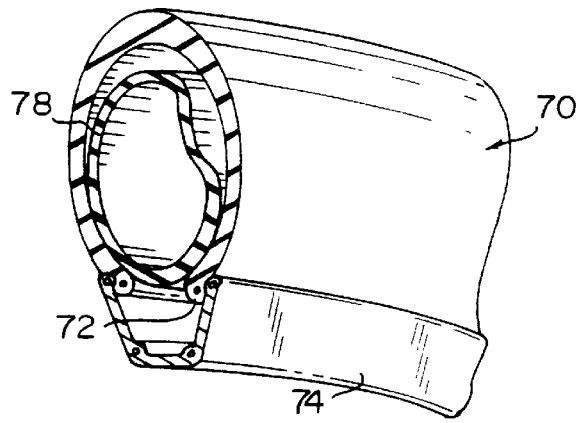
FIGS. 6A–C are fragmentary perspective views, partially in section, illustrating the use of the tire lever in engagement with the bead of a tire.
Figure 6B:
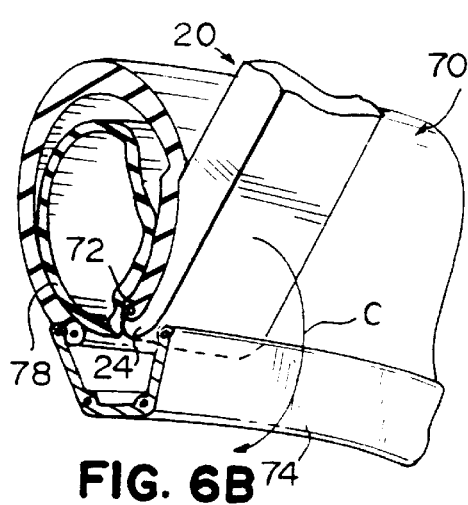
Figure 6C:
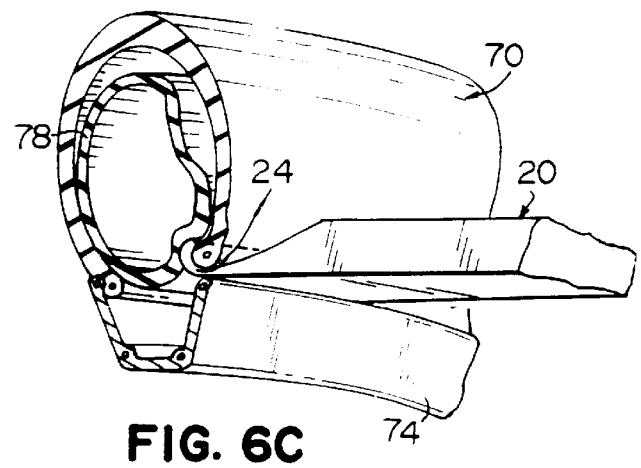

As seen best in FIGS. 1 and 5, the bottom surface 28 has a substantially planar portion 36 having a dove-tailed shaped groove 38 formed therein at the spoke-engaging end 26 of the body 22. As seen in FIG. 5, the top surface 30 also has a substantially planar portion 40 substantially parallel to the planar portion 36 of the bottom surface 28. The body 22 also includes a dove-tailed projection 42 projecting from the planar portion 40 of the spoke-engaging end 26 of the body 22. As seen in FIGS. 10 and 11, the dove-tailed projection 42 is dimensioned to mate with or slide into the dove-tailed groove 38 of another tire lever 20 to maintain two or more tire levers 20 together in a stacked arrangement for storage or packaging purposes.

Figures 2, 3:
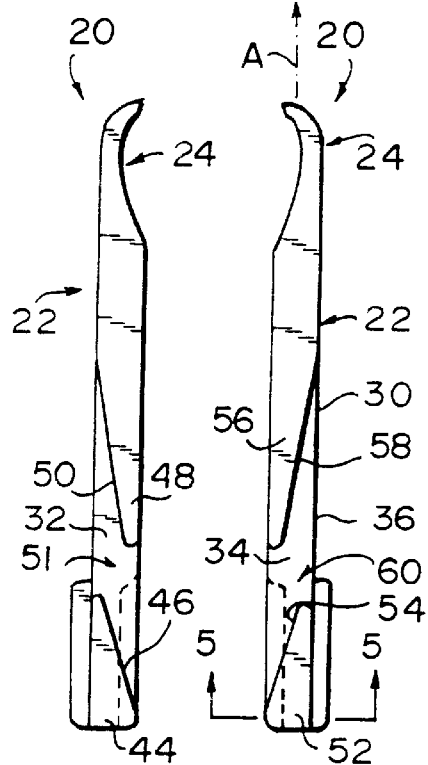
FIG. 2 is a left side elevational view of the lever of FIG. 1.
FIG. 3 is a right side elevational view of the lever of FIG. 1.
Figure 4:
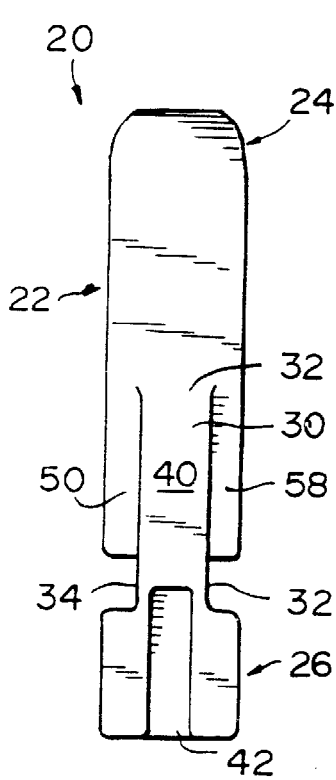
FIG. 4 is a is a top plan view of the lever of FIG. 1.
Figure 8:
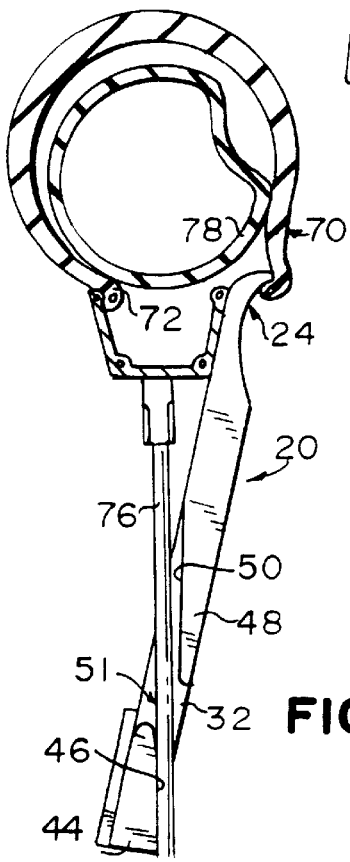
FIG. 8 is a side elevational view in partial section, illustrating the lever and wheel in the configuration of FIG. 7.

As seen best in FIGS. 2 and 8, the body 22 includes a first wall 44 projecting from the first side surface 32 at the spoke-engaging end 26 of the body 22. The first wall 44 has a substantially planar first spoke-engaging surface 46. The body 22 also includes a second wall 48 spaced from the first wall 44 and also projecting from side surface 32. The second wall 48 includes a substantially planar second spoke-engaging surface 50 substantially parallel to spoke-engaging surface 46. The side surface 32, and the first and second spoke-engaging surfaces 46 and 50 together form a first spoke-engaging slot 51. Each of the first and second spoke-engaging surfaces 46 and 50 respectively has an axial length greater than thickness of the body 22 (i.e., the distance between the planar portion 36 of the bottom surface 28 and the planar portion 40 of the top surface 30) and greater than ten percent and preferably greater than or equal to about twenty percent of the axial length of the body 22. Additionally, each of the first and second spoke-engaging surfaces 46 and 50 respectively intersects side surface 32 along substantially their entire axial length.

Figure 9:
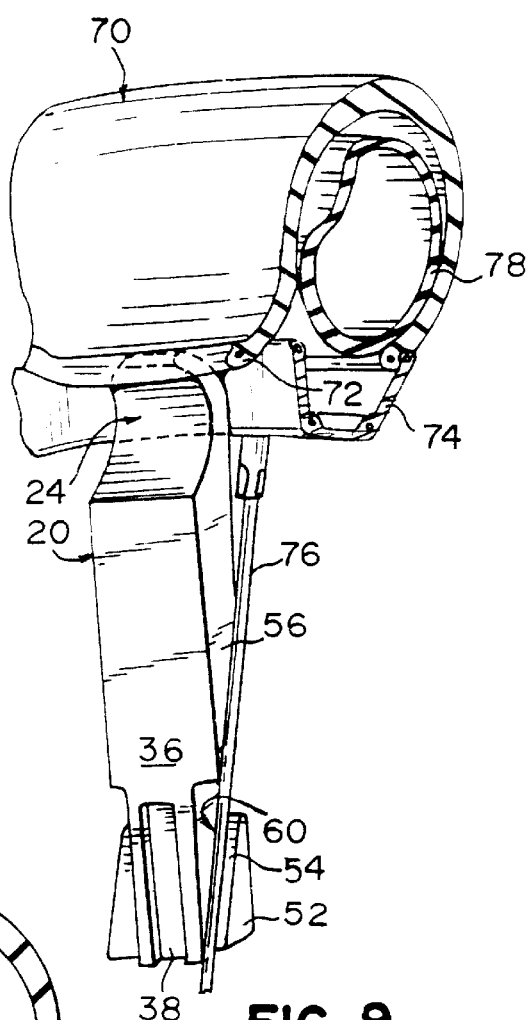
FIG. 9 is a view similar to FIG. 7 illustrating the spoke engaged with the other slot of the lever.

As seen best in FIGS. 3 and 9, the body 22 also includes a third wall 52 projecting from the second side surface 34 at the spoke-engaging end 26 of the body 22. The third wall 52 has a substantially planar third spoke-engaging surface 54. The body 22 also includes a fourth wall 56 spaced from the third wall 52 and also projecting from side surface 34. The fourth wall 56 includes substantially planar fourth spoke-engaging surface 58 substantially parallel to spoke-engaging surface 54. The side surface 34, and the third and fourth spoke-engaging surfaces 54 and 58 form a second spoke-engaging slot 60. Each of the third and fourth spoke engaging surfaces 54 and 58 has an axial length greater than the thickness of the body 22 (i.e., the distance between the planar portion 36 of the bottom surface 28 and the planar portion 40 of the top surface 30) and greater than ten percent and preferably greater than or equal to about twenty percent of the axial length of the body 22. Additionally, each of the third and fourth spoke-engaging surfaces 54 and 58 respectively intersects side surface 34 along substantially their entire axial length. Preferably, the walls 52 and 56 are, respectively, mirror images of the walls 44 and 48.

The first, second, third and fourth spoke-engaging surfaces 46, 50, 54, 58 or extensions thereof each form acute angles with each of the axis A and planar portions 36 and 40.

Figure 7:
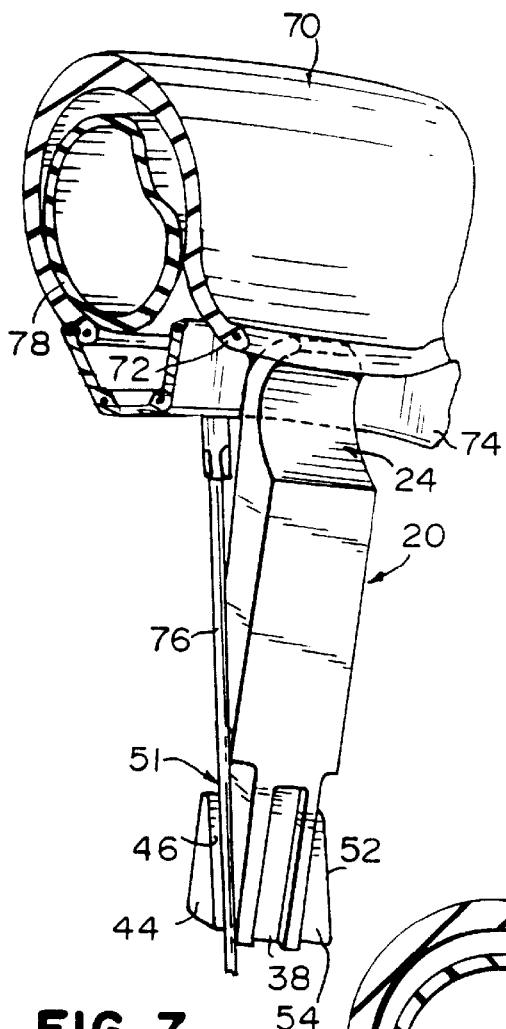
FIG. 7 is a fragmentary perspective view, partially in section, illustrating the lever engaged with both a spoke and the tire bead.

Referring to FIGS. 6–9, the use of the tire lever 20 to remove a tire 70 having a bead 72 from a rim 74 of a wheel having a plurality of spokes 76 will be described. As seen in FIG. 6A, the tire 70 has a tube 78 which is deflated prior to removal of the tire 70. A sidewall of the tire 70 is manually pushed inward off the rim 74. As seen in FIG. 6B, the tire-engaging end 24 of the tire lever 20 is inserted between the rim 74 and tire 70 and rotated to engage the bead 72. The tire lever 20, now engaged with the tire bead 72, is further pivoted on the rim 74 in the direction of arrow C (see FIGS. 6B & 6C) to lever a portion of the bead 72 over the edge of the rim 74 and space it therefrom. As seen in FIGS. 7–9, to maintain the tire bead 72 in this position (without manually holding the tire lever 20), the tire lever 20 is slid along the periphery of the rim 74 and pivoted as necessary to place a spoke 76 in one of the first spoke-engaging slot 51 or the second spoke-engaging slot 60. When a spoke 76 is disposed in the first spoke-engaging slot 51, as seen in FIGS. 7 and 8, and a user releases the lever 20, the tire 70 resiliently forces the first spoke-engaging surface 46 into engagement with the spoke 76, which maintains the lever 20 in a position engaging the bead 72 and maintaining the bead 72 spaced from the rim 74. This frees the user's hands to place a second tire lever between the bead 72 and the rim 74 to be worked around the perimeter of the tire 70 to remove the tire 70 from the rim 72.

Similarly, as seen in FIG. 9, if a user places the spoke 76 in the second spoke-engaging slot 60 and releases the lever 20, the tire 70 will resiliently force the third spoke-engaging surface 54 against the spoke 76 to maintain the lever 20 in a position to keep a portion of the bead 72 over and spaced from the rim 74.

The length of the first and third spoke-engaging surfaces provides more contact area with the spoke 76 than prior tire levers, affording better engagement of the spoke 76 and retention of the lever 20 in place.

Additionally, since the lever 20 has two engagement slots 51, 60, right-handed and left-handed users can each easily use the lever 20 to engage a spoke 76 in an unobstructed fashion because a spoke-engaging slot (51 or 60) can always face the eyes of the user. For example, as seen in FIG. 7, when a right-handed person has engaged the tire 70 with lever 20, the first spoke-engaging slot 51 faces the user so he easily sees how to place the spoke 76 therein. Similarly, as seen in FIG. 9, when a left-handed person has engaged the tire 70 with lever 20, the second spoke-engaging slot 60 faces the user so he easily sees how to place the spoke 76 therein.

With prior levers having only one spoke engagement slot, the slot often would, in use, face away from the eyes of either a left-handed or right-handed user, often making it more difficult for that user to engage the spoke therewith.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A tire lever for use in removing a tire having a bead from a bicycle wheel rim having a plurality of spokes disposed thereon, the lever comprising:
   an elongated body having a longitudinal axis, the body including:
      a tire engagement end for engaging the bead of the tire,
      a top surface,
      a bottom surface,
      a side surface connecting the top and bottom surfaces, and
      a first wall projecting from the side surface and defining a first engagement surface for engaging one of the spokes, the first engagement surface having an axial length greater than the distance between the top and bottom surfaces, the first engagement surface forming an acute angle with the axis.

2. The lever of claim 1, and further comprising a second wall projecting from the side surface and defining a second engagement surface spaced from the first engagement surface, the first and second engagement surfaces cooperating with the side surface to define an engagement slot for engaging one of the spokes of the bicycle wheel rim.

3. The lever of claim 2, wherein the first and second engagement surfaces are substantially parallel to each other.

4. The lever of claim 1, wherein the first engagement surface has an axial length greater than ten percent of the axial length of the body.

5. The lever of claim 1, wherein the first engagement surface intersects the side surface along substantially the entire axial length of the first engagement surface.

6. The lever of claim 1, wherein the first engagement surface has an axial length greater than or equal to about 20 percent of the axial length of the body.

7. A tire lever for use in removing a tire having a bead from a bicycle wheel rim having a plurality of spokes disposed thereon, the lever comprising:

an elongated body including:
  a tire engagement end for engaging the bead of the tire,
  a top surface,
  a bottom surface,
  first and second side surfaces respectively connecting the top and bottom surfaces,
  first and second walls projecting from the first side surface and cooperating therewith to define a first engagement slot for engaging one of the spokes, and
  third and fourth walls projecting from the second side surface and cooperating therewith to define a second engagement slot for engaging one of the spokes of the bicycle wheel rim.

8. The lever of claim 7, wherein the first and second walls respectively define first and second engagement surfaces substantially parallel to one another and the third and fourth walls respectively define third and fourth engagement surfaces substantially parallel to one another.

9. The lever of claim 8, wherein the top surface has a substantially planar top portion and the bottom surface has a substantially planar bottom portion parallel to the top portion, wherein the first, second, third and fourth engagement surfaces respectively form acute angles with the bottom and top portions.

10. The lever of claim 9, wherein the bottom portion has an engagement groove formed therein, and further comprising an engagement projection projecting from the top portion, whereby the engagement groove can receive an engagement projection of a second lever to connect the two levers together.

11. The lever of claim 8, wherein each of the first and third engagement surfaces has an axial length greater than ten percent of the axial length of the body.

12. The lever of claim 7, wherein each of the first and third engagement surfaces has an axial length greater than or equal to about 20 percent of the axial length of the body.

13. A tire lever for use in removing a tire having a bead from a bicycle wheel rim having a plurality of spokes disposed thereon, the lever comprising:
  an elongated body including:
    a tire engagement end for engaging the bead of the tire,
    a top surface having a substantially planar top portion,
    a bottom surface having a substantially planar bottom portion,
    a side surface connecting the top and bottom surfaces, and
    a first wall projecting from the side surface and defining a first substantially planar engagement surface for engaging one of the spokes of the bicycle rim, the first substantially planar engagement surface forming acute angles with the top and bottom portions.

14. The lever of claim 13, and further comprising a second wall projecting from the side surface and defining a second engagement surface spaced from the first engagement surface, the first and second engagement surfaces cooperating with the side surface to define an engagement slot for engaging one of the spokes of the bicycle wheel rim.

15. The lever of claim 14, wherein the first and second engagement surfaces are substantially parallel to each other.

16. The lever of claim 13, wherein the first engagement surface has an axial length greater than ten percent of the axial length of the body.

17. The lever of claim 13, wherein the first engagement surface has an axial length greater than the distance between the top and bottom portions.

18. The lever of claim 13, wherein the first engagement surface has an axial length greater than or equal to about 20 percent of the axial length of the body.

* * * * *